(12) United States Patent
Rabasa et al.

(10) Patent No.: US 11,629,677 B2
(45) Date of Patent: Apr. 18, 2023

(54) METHODS AND SYSTEMS FOR AN AIRBOX

(71) Applicant: Ford Global Technologies, LLC, Dearborn, MI (US)

(72) Inventors: Luis Rabasa, Naucalpan (MX); David K Gonzalez Bojorges, Mexico City (MX); Jose Quezada, Tlalnepantla (MX); Roger Khami, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 17/125,759

(22) Filed: Dec. 17, 2020

(65) Prior Publication Data

US 2022/0195970 A1 Jun. 23, 2022

(51) Int. Cl.
*F02M 35/024* (2006.01)
*F02M 35/02* (2006.01)

(52) U.S. Cl.
CPC .. *F02M 35/02416* (2013.01); *F02M 35/0202* (2013.01)

(58) Field of Classification Search
CPC ......... F02M 35/02416; F02M 35/0202; F02M 35/024; F02M 35/02441; F02M 35/02483; F02M 35/0201; F02M 35/0203; B01D 46/00; B01D 46/0002; B01D 46/0005; B01D 46/0006
See application file for complete search history.

(56) References Cited

U.S. PATENT DOCUMENTS

| | | | |
|---|---|---|---|
| 4,826,517 A | 5/1989 | Norman | |
| 7,004,986 B2* | 2/2006 | Kopec | B01D 46/0004 55/357 |
| 7,351,270 B2* | 4/2008 | Engelland | F02M 35/0203 55/504 |
| 7,682,416 B2 | 3/2010 | Engelland et al. | |
| 7,771,502 B2* | 8/2010 | Germain | F02M 35/024 55/506 |
| 7,972,405 B2* | 7/2011 | Engelland | F02M 35/02416 55/480 |
| 8,382,876 B2 | 2/2013 | Widerski et al. | |
| 8,496,723 B2* | 7/2013 | Reichter | B01D 46/0005 55/502 |
| 8,562,707 B2 | 10/2013 | Nepsund et al. | |
| 8,597,390 B2* | 12/2013 | Aizawa | B01D 46/0006 55/506 |
| 8,915,985 B2* | 12/2014 | Dewit | B23P 19/04 55/482 |
| 9,359,979 B2 | 6/2016 | Schmid et al. | |
| 9,586,168 B2* | 3/2017 | Schmid | B01D 46/525 |
| 9,657,878 B2 | 5/2017 | Hartmann | |

(Continued)

FOREIGN PATENT DOCUMENTS

| | | |
|---|---|---|
| AT | 512397 A4 | 8/2013 |
| CN | 202914941 U | 5/2013 |

(Continued)

*Primary Examiner* — Grant Moubry
(74) *Attorney, Agent, or Firm* — Vincent Mastrogiacomo; McCoy Russell LLP (57) ABSTRACT

Methods and systems are provided for an airbox. In one example, the airbox is a single piece comprising features to receive and retain a platform for an air filter. The airbox comprises curved elastomers which engage with coupling elements of the platform.

16 Claims, 7 Drawing Sheets

(56) References Cited

U.S. PATENT DOCUMENTS

| | | | |
|---|---|---|---|
| 10,183,248 B2 * | 1/2019 | Ishikawa | B01D 46/0006 |
| 11,339,751 B2 * | 5/2022 | Moyer | F02M 35/10281 |
| 2003/0221562 A1 * | 12/2003 | Bloomer | F02M 35/0215 |
| | | | 96/384 |
| 2004/0020177 A1 * | 2/2004 | Ota | B01D 46/88 |
| | | | 55/506 |
| 2013/0174385 A1 | 7/2013 | Saunders et al. | |
| 2016/0090947 A1 * | 3/2016 | Tomlin | F02M 35/082 |
| | | | 55/482 |
| 2020/0132025 A1 * | 4/2020 | Williams | F02M 35/10091 |

FOREIGN PATENT DOCUMENTS

| | | |
|---|---|---|
| DE | 102010023282 A1 | 12/2011 |
| DE | 102013100033 A1 | 7/2013 |
| EP | 0709567 A1 | 5/1996 |

* cited by examiner

METHODS AND SYSTEMS FOR AN AIRBOX

FIELD

The present description relates generally to an airbox for an engine.

BACKGROUND/SUMMARY

Engines may use an air filter to remove debris and other particulates from an intake air flow to decrease contamination. The air filter may be arranged in an airbox. In previous examples, the air filter may be manufactured as a rectangular panel configured to fit into the airbox.

An enclosure for the airbox may be manufactured using plastic resin and only injection molding techniques. The molding may separately manufacture a tray and a cover. The air filter may be sandwiched between the tray and the cover with an integral seal.

Thus, the plastic resin and injection molded techniques are relatively complex and do not provide a desired single-piece airbox meeting desired tolerances. A desire for the one-piece airbox may still exist to decrease manufacturing costs and time.

In one example, the issues described above may be addressed by a system including an airbox having a slot through which an air filter is configured to slide, wherein the air filter is retained within the airbox via a snap fit engaging with a curved elastomer of the airbox. In this way, the airbox may be blow molded while maintaining desired tolerances.

As one example, the snap fit is arranged on an outer wall of the air filter. The snap fit comprises a locking hook configured to engage with a recess within an air filter compartment of the airbox. The recess comprises the curved elastomer, which engages with a portion of the locking hook and an arm of the snap fit, wherein the arm extends from the outer wall to the locking hook. By doing this, a longevity of the snap fit may be increased while allowing the air filter to be easily serviced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-13C are shown approximately to scale. However, other relative dimensions may be used if desired.

DETAILED DESCRIPTION

Figure 11:
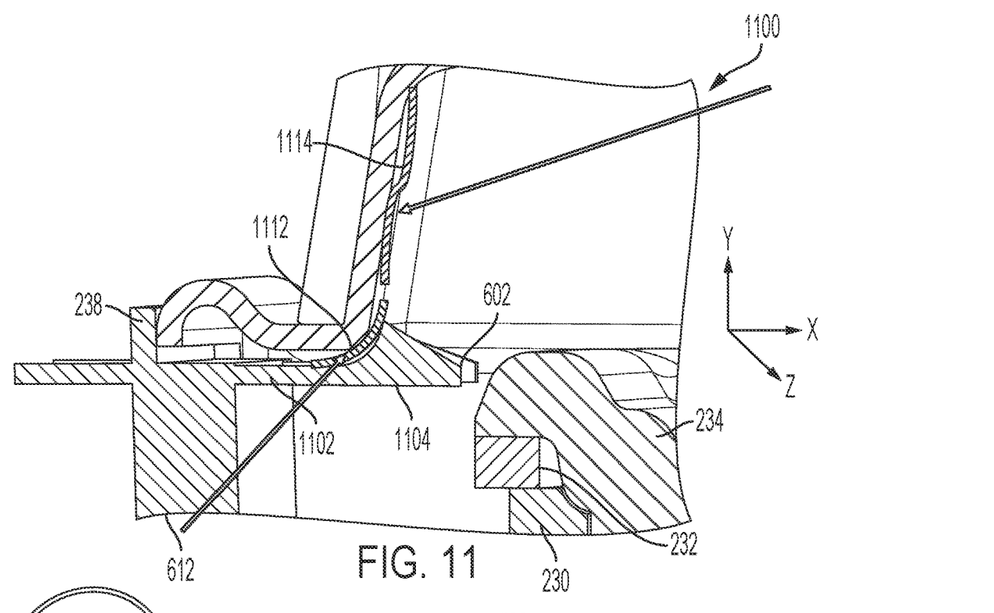
FIG. 11 illustrates a snap fit of the lower base engaging with a contour of the airbox comprising a rounded elastomer.

The following description relates to systems and methods for an airbox. The airbox of the present disclosure is blow molded as a single-piece free of welds or other coupling elements. The airbox may include an opening, such as a slot, configured to receive a lower base (e.g., a platform) of an air filter, as illustrated in FIGS. 2, 3, 4, 5, and 13A. The opening may be designed to receive the lower base in a sliding motion. The airbox may include recesses configured to receive slide features of the lower base. The lower base may include one or more snap fit features configured to engage with interior contoured features of the airbox to retain the lower base therein, as shown in FIGS. 6 and 11.

Figure 7:
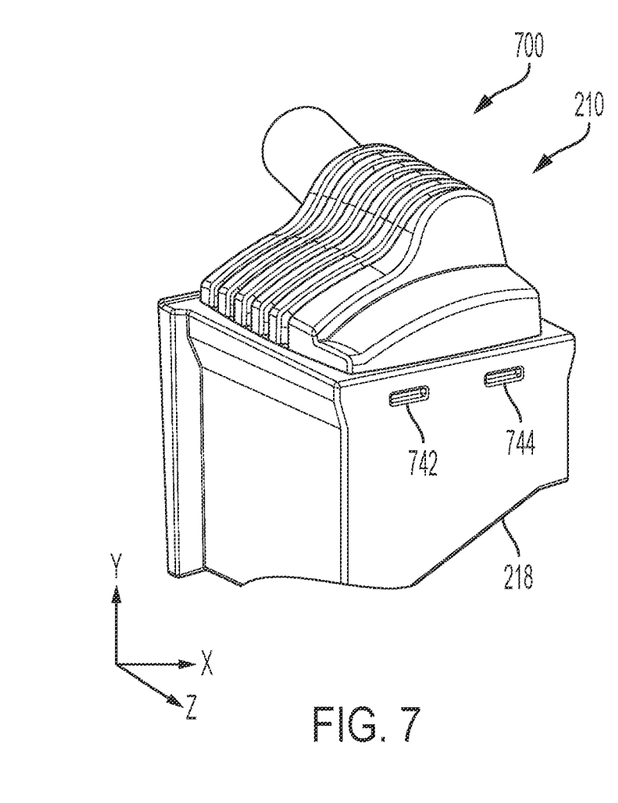
FIG. 7 illustrates a view of a rear surface of the airbox.
Figure 8:
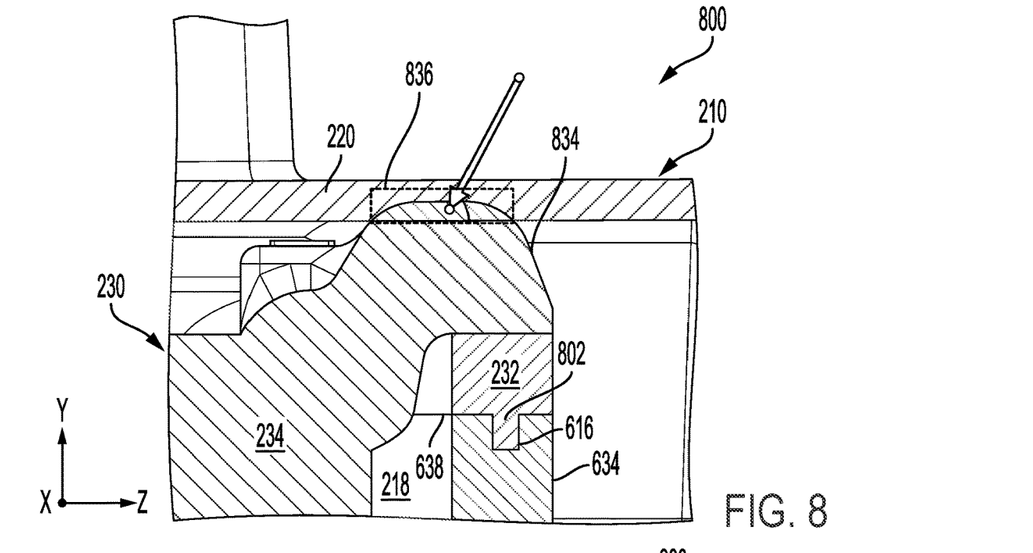
FIG. 8 illustrates a position of a seal when the air filter is completely arranged in the air filter compartment of the airbox.
Figure 9:
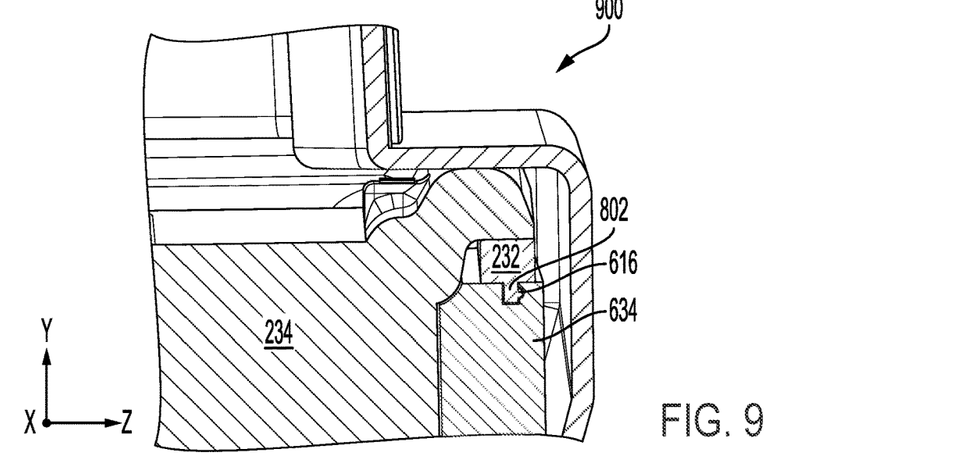
FIG. 9 illustrates a shape of the seal engaging with the lower base.
Figure 10:
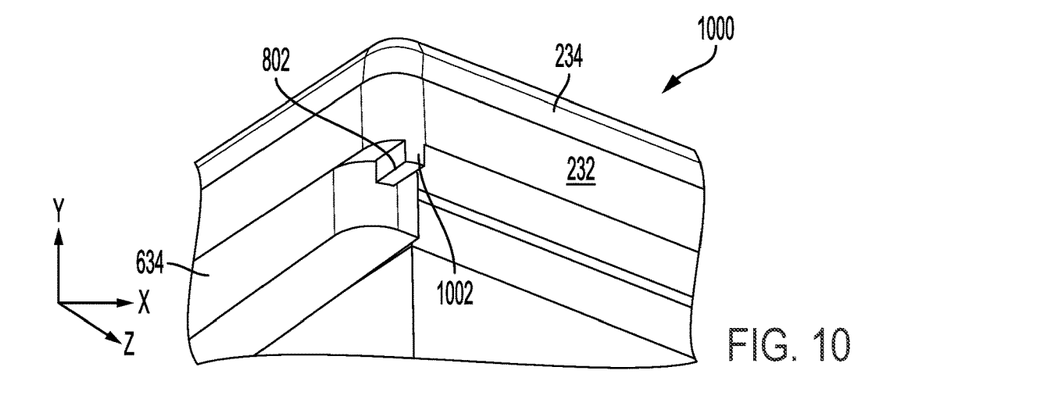
FIG. 10 illustrates a shape of the seal independent of the lower base.
Figure 12:
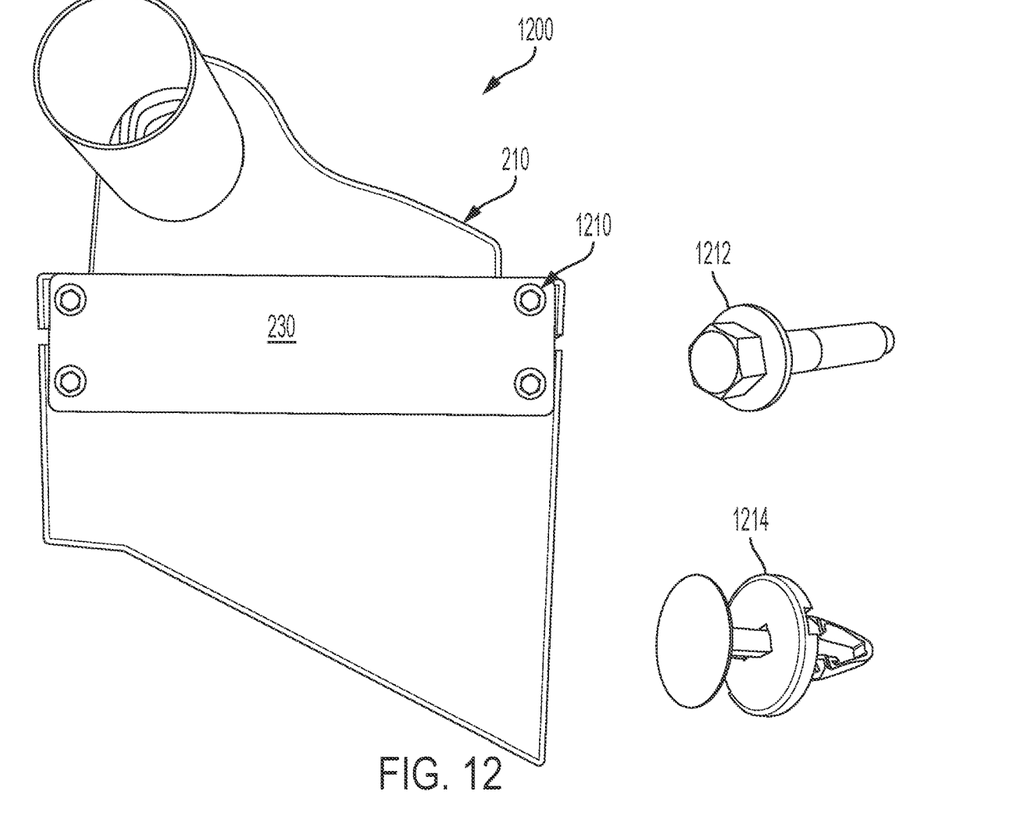
FIG. 12 illustrates the lower base being physically coupled to the airbox.
Figure 13A:
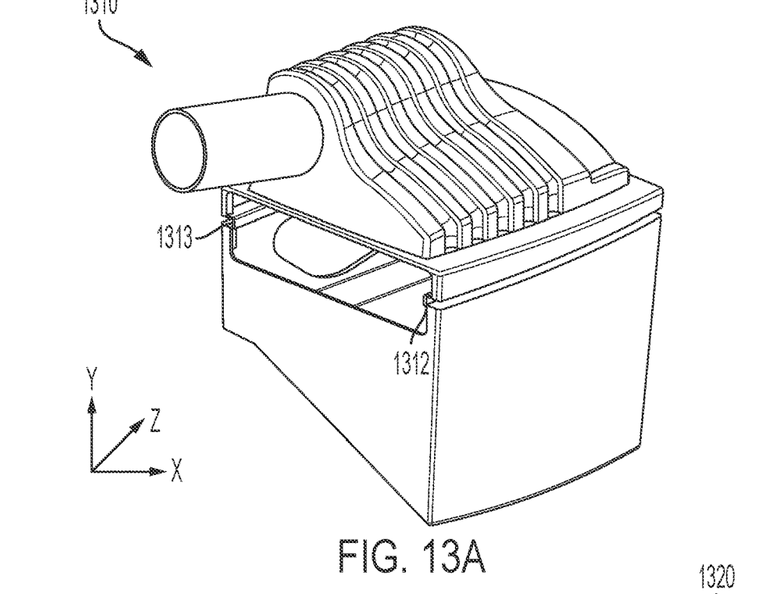
FIGS. 13A, 13B, and 13C illustrate an alternative embodiment of the airbox, the air filter, and the platform, respectively.
Figure 13B:
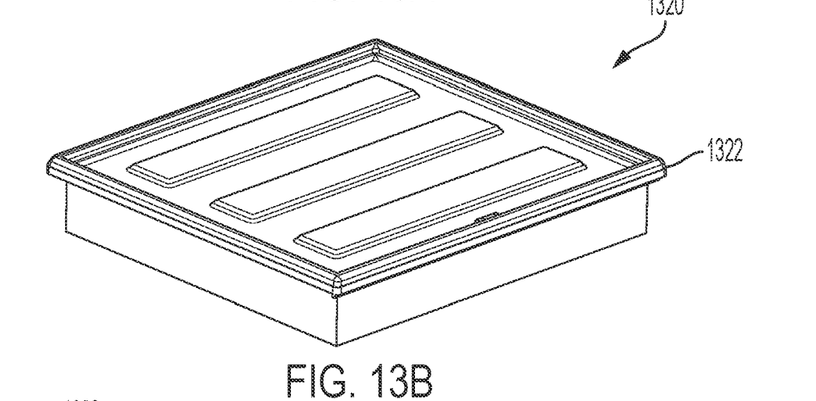
Figure 13C:
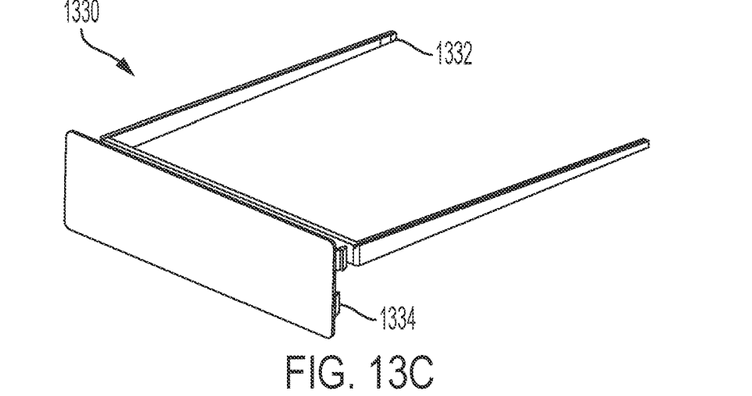

FIG. 7 illustrates a surface of the airbox configured to limit a movement of the lower base into the airbox. FIGS. 8, 9, and 10 illustrate seals of the airbox. The lower base may be fixedly coupled to the airbox via one or more fasteners other than the snap rings, as shown in FIG. 12. A second embodiment of the airbox, the lower base, and the air filter are illustrated in FIGS. 13A, 13B, and 13C.

FIGS. 1-13C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 1:
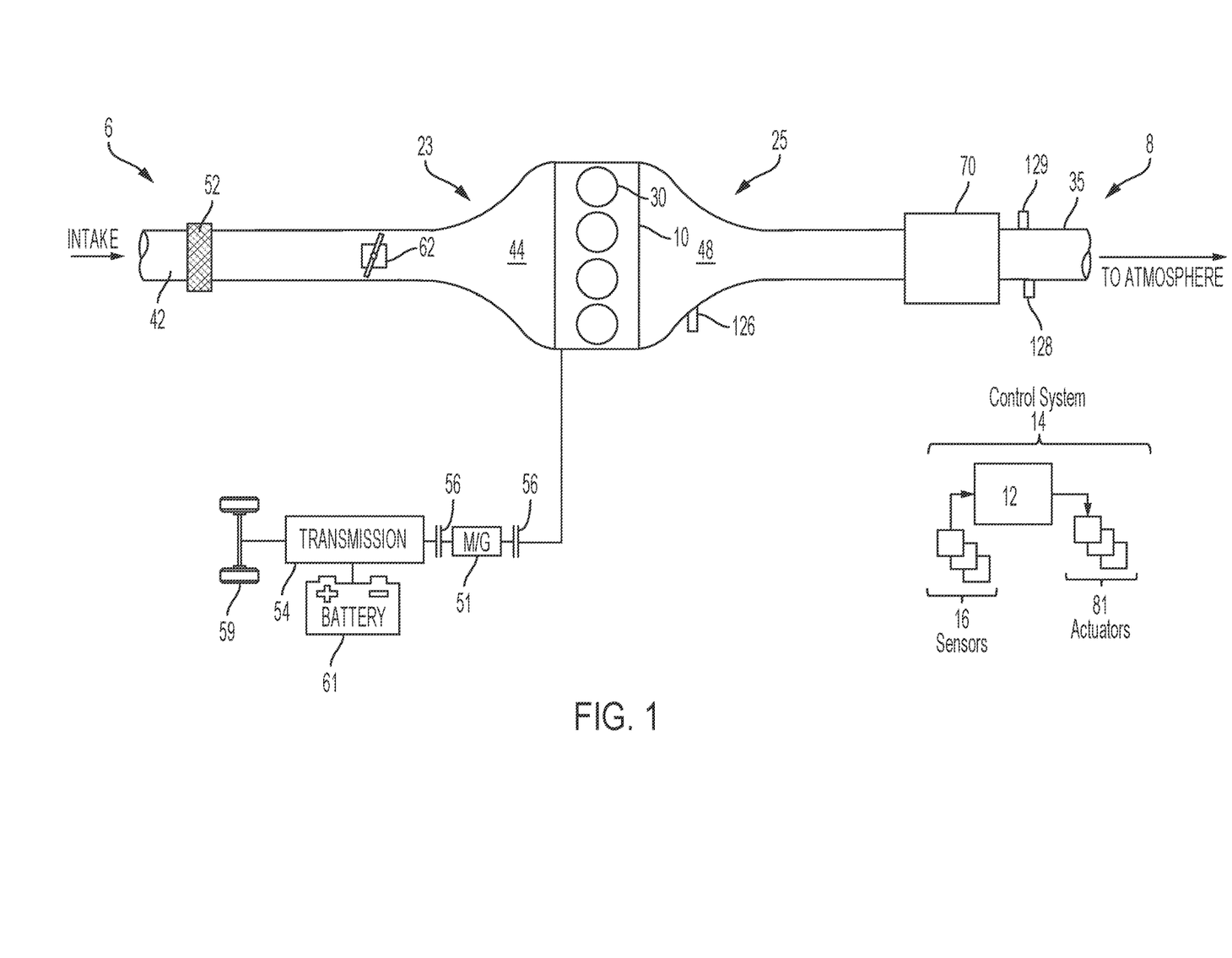
FIG. 1 illustrates a schematic depiction of an internal combustion engine including an air intake system.

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Figure 2:
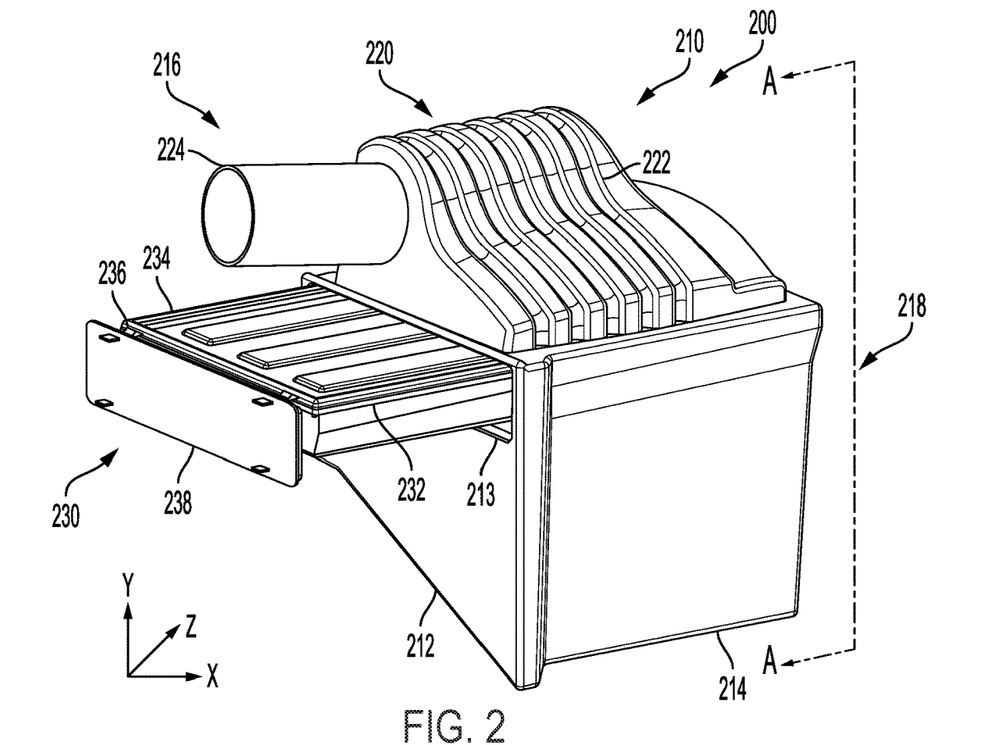
FIG. 2 illustrates a perspective view of an airbox and an air filter.

Turning now to FIG. 2, it shows an embodiment 200 of an airbox 210. The airbox 210 may be arranged in an intake system, such as intake system 23 of FIG. 1. In one example, the airbox 210 may be configured to house the air filter 52 of FIG. 1.

The airbox 210 includes a front wall 212, a first side wall 214, a second side wall 216, and a back wall 218. The airbox 210 further comprises a top surface 220 physically coupled to upper edges of each of the front wall 212, the first side wall 214, the second side wall 216, and the back wall 218. While the front wall 212, the first side wall 214, the second side wall 216, the back wall 218, and the top surface 220 are described distinctly, the airbox 210 of the present disclosure is manufactured as a single piece. In one example, the airbox 210 is blow-molded. A method of blow-molding the airbox 210 may include where pressurized air is flowed to a mold cavity to shape the various features of the airbox 210. Additionally or alternatively, one or more features may be cut into the airbox 210 following the blow molding process.

The top surface 220 may include a plurality of recesses 222 following a contour of the top surface 220. Each recess of the plurality of recesses 222 may be substantially identical to one another. The plurality of recesses 222 may be shaped during the blow molding process, wherein the plurality of recesses 222 may enhance a structural integrity of the airbox 210. In one example, the plurality of recesses 222 comprises a bead shape, wherein the plurality of recesses 222 include a fixed width, a fixed angle of depression, and a fixed height. One or more of the width, angle of repression, and the height may be adjusted based on geometries of the intake system and/or an engine.

The top surface 220 may further include a conduit 224 configured to receive or expel intake air. The conduit 224 extends from a portion of the top surface parallel to the front wall 212. The conduit 224 may include a cylindrical or other tubular shape. In one example, the conduit 224 receives intake air through a grill or other opening of a vehicle and expels the intake air to a remainder of an intake system through an opening (e.g., opening 316 of FIG. 3) arranged on the second side wall 216. Additionally or alternatively, intake air may enter the airbox 210 via the opening in the second side wall 216 and flow to the remainder of the intake system via the conduit 224.

A platform 230 may include one or more of a filter base 232 and a filter 234. The filter 234 may be arranged in the filter base 232. The filter base 232 may be manufactured via the injection molding process described above as a separate piece relative to the airbox 210. The platform 230 may include an opening configured to receive the filter base 232 and the filter 234. The opening is described in greater detail below with respect to FIG. 6.

The platform 230 further comprises a plurality of snap fits 236 extending from a platform outer face 238 (interchangeably referred to herein as a platform door 238). The plurality of snap fits 236 may engage with an interior surface of the airbox 210. The plurality of snap fits 236 may be configured to retain the platform 230 within an air filter compartment of the airbox 210 without fasteners or other coupling elements.

As illustrated in the example of FIG. 2, the platform 230 is partially inserted through a slot 213 arranged in the front wall 212 of the airbox 210. The slot 213 may be shaped correspondingly to the platform 230 such that a seal may be formed therebetween.

Figure 3:
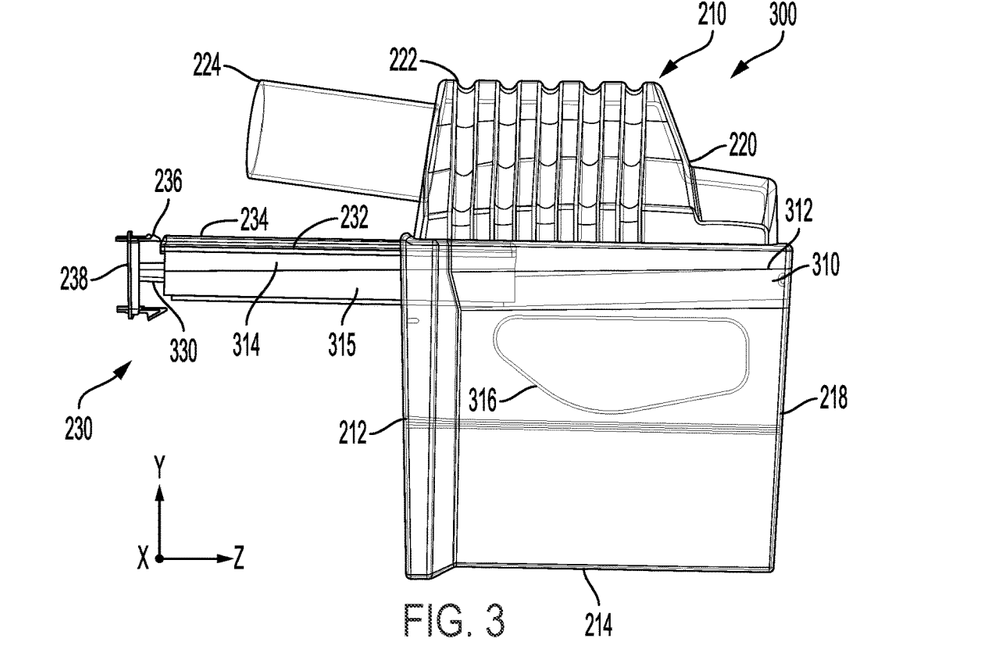
FIG. 3 illustrates a side view of the airbox as the air filter is being inserted therein, with the airbox drawn as partially transparent.

Turning now to FIG. 3, it shows a view 300 of the airbox 210 illustrated as partially transparent. More specifically, the first side wall 214 is transparent to reveal an interior volume and the second side wall 216. The cross-sectional view 300 exposes an air filter compartment 310 of the airbox 210. As such, components previously introduced may be similarly numbered in this figure and subsequent figures. The platform 230 may slide into the air filter compartment 310 via one or more slidingly engaging features of the platform 230 and the air filter compartment 310. More specifically, the air filter compartment 310 may include a slider ramp 312 configured to slidingly engage with an interface between a linear surface 314 and an angled surface 315 of the platform 230. The slider ramp 312 is illustrated in greater detail with respect to FIG. 4 and the angled surface is illustrated in greater detail with respect to FIG. 6.

The platform 230 may include a spacer 330. The spacer 330 may be arranged between the linear surface 314 and the outer face 238. In one example, the spacer 330 creates a gap between the linear surface 314 and the outer face 238, wherein the plurality of snap fits 236 may extend into the gap without contacting the linear surface 314 and/or the air filter 234. The spacer 330 may comprise a rectangular, tubular, or other shape. In one example, the spacer 330 is a single spacer that extends along a majority of a width of the outer face (measured along the x-axis). Additionally or alternatively, the spacer 330 may include a plurality of spacers, wherein the spacers may be identically shaped and spaced away from one another.

Figure 4:
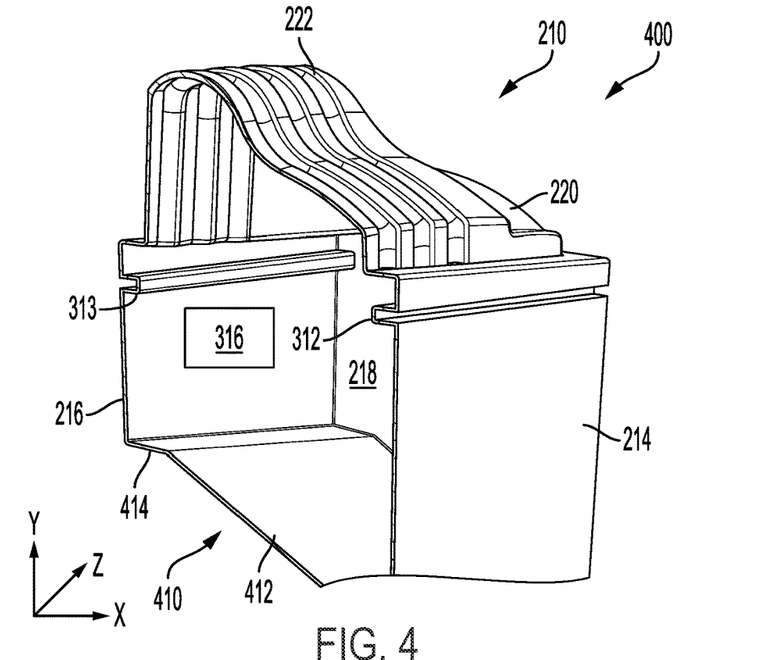
FIG. 4 illustrates a prophetic engine operating sequence relating engine operating parameters and exhaust passage air injections.

Turning now to FIG. 4, it shows an internal view 400 of the airbox 210 with the front wall 212 omitted. As such, an interior volume of the airbox 210 is revealed.

The airbox 210 may include a lower surface 410. In one example, the interior volume of the airbox 210 is defined via the front wall 212, the first side wall 214, the second side wall 216, the back wall 218, the top surface 220, and the lower surface 410. The lower surface 410 may include a first portion 412 and a second portion 414. The first portion 412 may include an angled wall, wherein the first portion 412 extends from a bottommost portion of the first side wall 214 toward the second portion 414. In one example, the first portion 412 extends upward from the first side wall 214 toward the top surface 220. The second portion 414, which may extend within a fixed plane, may physically couple to a bottommost portion of the second side wall 216. In this way, a height of the first side wall 214, measured along the y-axis, is greater than a height of the second side wall 216. In the example of FIG. 4, the first portion 412 includes a length, measured along the x-axis, greater than a length of the second portion 414. However, it will be appreciated that the lengths of the first portion 412 and the second portion 414 may be adjusted without departing from the scope of the present disclosure. In one example, the first portion 412 may enhance a structural integrity of the airbox 210 such that deformation due to vibrations and heat may be mitigated.

The slider ramp 312 is a first slider ramp 312 herein. The airbox 210 further comprises a second slider ramp 313. The first slider ramp 312 extends from the first side wall 214 into the interior volume of the airbox 210 and the second slider ramp 313 extends from the second side wall 216 into the interior volume of the airbox 210 toward the first slider ramp 312. The first slider ramp 312 and the second slider ramp 313 may comprise an identical shape and size. In one example, the first slider ramp 312 and the second slider ramp 313 comprise a rectangular shape.

In the example of FIG. 4, each of the first slider ramp 312 and the second slider ramp 313 may be upwardly angled. That is to say, portions of the first slider ramp 312 and the second slider ramp 313 nearest the front wall may be vertically lower than portions nearest the back wall 218 relative to the y-axis. The angle of the first slider ramp 312 and the second slider ramp 313 may correspond to angle of the surfaces of the platform (e.g., linear surface 314 of the platform 230 of FIG. 3).

Figure 5:
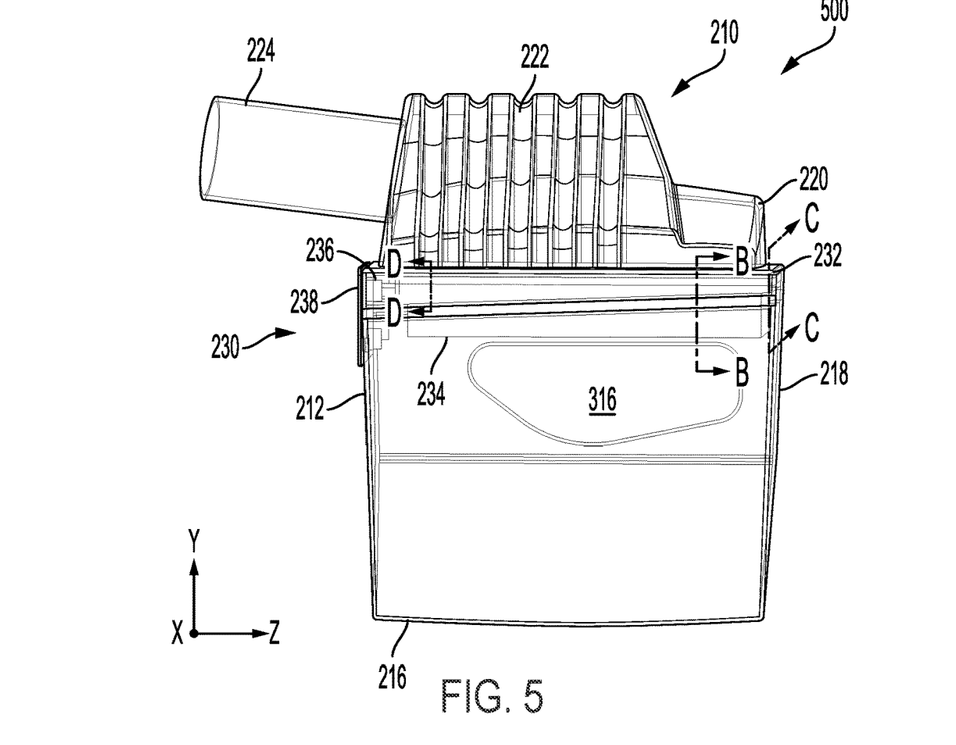
FIG. 5 illustrates a cross-sectional view of the airbox with the air filter completely inserted therein.
Figure 6:
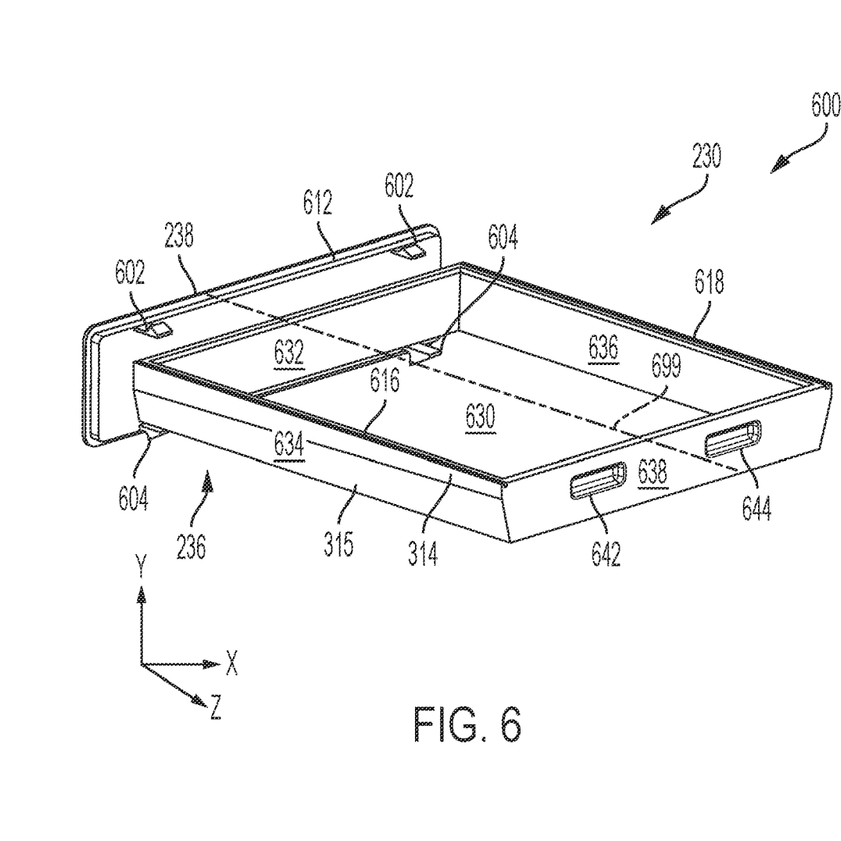
FIG. 6 illustrates a perspective view of a lower base of the air filter.

Turning now to FIG. 5, it shows a cross-sectional view 500 of the airbox 210 and the platform 230, wherein the cross-sectional view is taken along the cutting plane A-A of FIG. 2. In one example, the cross-sectional view 500 differs from the cross-sectional view 300 in that the platform 230 is fully inserted into the airbox 210. In the example of FIG. 5, the outer face 238 is flush with the front wall 212 of the airbox 210. Furthermore, a bottommost portion of the air filter 234 is vertically above a highest portion of the opening 316.

Turning now to FIG. 6, it shows a view 600 of the platform 230. In the example of FIG. 6, the platform 230 is illustrated without the air filter (e.g., air filter 232 of FIG. 2) inserted therein. In the view 600, reveals an opening 630 into which the air filter is arranged. The opening 630 may be shaped via a front surface 632, a first side surface 634, a second side surface 636, and a back surface 638. The front surface 632 may be adjacent and parallel to the outer face 238. The first side surface 634 and the second side surface 636 may be parallel to one another and normal to the front surface 632 and the back surface 638. As mentioned in the description of FIG. 3, the first side surface 634 and the second side surface 636 include the linear surface 314, configured to engage with the slider ramps of the airbox. The first side surface 634 and the second side surface 636 may further include an angled surface 315. While the linear surface 314 is normal to each of the front surface 632 and the back surface 638 throughout its length, the angled surface 315 is angled relative to the front surface 632 and the back surface 638. In one example, the angled surface 315 is angled inward toward the opening 630. In this way, a width of the platform, measured along the x-axis, may be greater at the linear surface 314 than at the angled surface 315. By shaping the platform 230 in this way, the platform 230 may be blocked from moving in a negative y-direction via the slider ramps.

In one example, the linear surface 314 may include a narrowing height from the front surface 632 to the back surface 638. That is to say, the linear surface 314 may include a first height near the front surface 632 and a second height near the back surface 638, wherein the first height is greater than the second height. The angled surface 315 is complementary to the linear surface 314, such that a height of the angled surface 315 is greater at the back surface 638 than at the front surface 632. Additionally or alternatively, the slider ramps of the airbox may comprise a similar narrowing to the linear surface 314.

The first side surface 634 and the second side surface 636 further comprise a first channel 616 and a second channel 618, respectively. The first channel 616 and the second channel 618 may traverse an entire length of the first side surface 634 and the second side surface 636, respectively, measured along the z-axis. The first channel 616 and the second channel 618 may be configured to engage with a filter base (e.g., the filter base 232 of FIG. 2). The coupling between the first channel 616 and the second channel 618 is illustrated in greater detail with respect to FIGS. 8, 9, and 10.

The front surface 632 and the back surface 638 may be identically shaped. Due to the shape of the first and second side surfaces 634, 636, the front surface 632 and the back surface 638 may include six sides. In one example, the front surface 632 and the back surface 638 may include an asymmetric hexagonal shape. It will be appreciated that the front surface 632 and the back surface 638 may include other shapes without departing from the scope of the present disclosure.

The back surface 638 further includes a first element 642 and a second element 644. The first element 642 and the second element 644 may be identically shaped and sized to one another. In one example, the first element 642 is biased toward the first side surface 634 and the second element 644 is biased toward the second side surface 636. The first element 642 and the second element 644 may be arranged such that the back surface 638 is symmetric about a central axis 699 of the platform 230. Additionally or alternatively, the first element 642 and the second element 644 may be spaced, sized, or shaped differently than the example of FIG. 6 such that the platform 230 is asymmetric.

In one example, the first element 642 and the second element 644 are recessed embossments. A size and/or a shape of the opening 630 may not be affected by the first element 642 or the second element 644 such that the opening 630 maintains a relatively square or rectangular shape. In this way, the first element 642 and the second element 644 may not extend through a thickness of the back surface 638, wherein the thickness is measured along the z-axis.

The first element 642 and the second element 644 may include a rectangular cross-sectional shape taken along the x-y plane. In one example, the first element 642 and the second element 644 comprises a rectangular prism shape, wherein corners and sides of the rectangular prism are rounded. The first element 642 and the second element 644 may be configured to mate with features arranged on a back wall of the airbox. In this way, the first element 642 and the second element 644 may aid a user during an assembly process as the platform 230 is slid into the airbox.

The outer surface 238 is shown including an inner surface 612. The plurality of snap fits 236 extend from the inner surface 612 toward the front surface 632. The inner surface 612 may be smaller than the outer surface 238. The inner surface 612 may be sized to fit within an opening of the airbox through which the platform 230 is inserted. As such, the outer surface 238 does not enter the airbox and remains outside of the interior volume of the airbox when the platform 230 is fully inserted into the interior volume of the airbox.

In one example, the inner surface 612 and the slot (e.g., slot 213 of FIG. 2) comprise complementary surfaces such that the inner surface 612 and the slot are in face-sharing contact when the platform 230 is fully inserted into the airbox. The inner surface 612 and the slot may form a seal therebetween such that air may not pass through the interface therebetween.

The plurality of snap fits 236 include a first set of snap fits 602 and a second set of snap fits 604. The first set of snap fits 602 may be oriented in a first orientation and the second set of snap fits 604 may be oriented in a second orientation, opposite the first orientation relative to the y-axis. The plurality of snap fits 236 may include a main body 652 and a hook 654 extending therefrom. The first set of snap fits 602 and the second set of snap fits 604 differ in that their respective hooks face opposite directions along the y-axis. A snap fit of the first set of snap fits 602 is illustrated in greater detail with respect to FIG. 11.

Turning now to FIG. 7, it shows a view 700 of the airbox 210. The view 700 illustrates the back wall 218, which includes a first back wall element 742 and a second back wall element 744. The first back wall element 742 may be shaped to insert into the first element 642 of the platform 230 of FIG. 6 when the platform is fully inserted into an interior space of the airbox 210. Similarly, the second back wall element 744 may be shaped to insert into the second element 644 of the platform 230 of FIG. 6 when the platform is fully inserted into the interior space of the airbox 210. As such, the first back wall element 742 and the second back wall element 744 may be shaped based on a shape of the first element 642 and the second element 644, respectively. In the example of FIG. 7, the first back wall element 742 and the second back wall element 744 are identically shaped. However, it will be appreciated that the first back wall element 742 and the second back wall element 744 may be differently shaped without departing from the scope of the present disclosure. In one example, a combination of the first element 642, the second element 644, the first back wall element 742, and the second back wall element 744 are configured to assist a user in assembling the airbox and the platform in a desired orientation. In one example, the first element 642, the second element 644, the first back wall element 742, and the second back wall element 744 function as a poka-yoke, with a specifically designed embossment that blocks undesired assemblies of the platform and the airbox.

Turning now to FIGS. 8, 9, and 10, they show various views of the filter base 232 and the filter 234. More specifically, FIG. 8 illustrates a cross-sectional view 800 taken along cutting plane B-B of FIG. 5. The cross-sectional view 800 illustrates a position of the filter base 232, the filter 234, and the platform 230 when the platform is fully inserted (e.g., slid) into an interior volume of the airbox 210. As illustrated, an outer perimeter 834 of the air filter 234 is at least partially compressed by the top surface 220 in response to the back surface 638 contacting the back wall 218 of the airbox 210. The dashed box 836 illustrates an amount of compression of the outer perimeter 834. The cross-sectional view 900 illustrates an example similar to the cross-sectional view 800, except that the cross-section view 900 illustrates the outer perimeter 834 in face-sharing contact with an interior surface of the top surface 220 and does not illustrate the contacts of the dashed box 836. It will be appreciated that the outer perimeter 834 does not extend into the top surface 220 and the dashed box 836 is merely illustrative to demonstrate a compressed position of the outer perimeter 834 when the platform 230 is fully inserted into the airbox 210.

The cross-sectional view 800 further illustrates the first channel 616 engaged with a lateral locking feature 802 of the base 232. The lateral locking feature 802 may be shaped to extend through at least an entire length of the first channel

616. The lateral locking feature 802 may limit movement of the base 232 independent of the platform 230. That is to say, the lateral locking feature 802 may allow the platform 230 and the base 232 to move in tandem such that separation is less likely. In one example, the lateral locking feature 802 comprises a rectangular cross-sectional shape. Additionally or alternatively, the lateral locking feature 802 may comprise one or more protrusions and indentations to match a shape of the first channel 616.

Turning to FIG. 10, it shows a cross-sectional view 1000 taken along cutting plane C-C of FIG. 5. The cutting plane C-C is normal to the cutting plane B-B, wherein the cross-sectional view 1000 illustrates an offset 1002 of the lateral locking feature 802. The offset 1002 corresponds to a portion of the lateral locking feature 802 that extends beyond a length of the first channel 616. The offset 1002 may allow some longitudinal motion of the air filter base 232 along the z-axis independent of the platform 230.

Turning now to FIG. 11, it shows a cross-sectional view 1100 taken along cutting plane D-D of FIG. 5. The cross-section view 1100 illustrates one of the first set of snap fits 602. The snap fit may include an extension arm 1102. The extension arm 1102 may extend from the inner surface 612 of the platform 230 toward the air filter 234. A hook 1104 may be arranged at an extreme end of the extension arm 1102. In one example, the hook 1104 includes a curved surface configured to engage with a surface of the airbox 210. The hook 1104 of the first set of snap fits 602 is curved in an upward direction along the y-axis. As such, hooks of the second set of snap fits 604 of FIG. 6 may curve in an opposite direction.

The surface of the airbox 210 may include an elastomeric insert 1112. In one example, the elastomeric insert 1112 may be curved, which may enhance an engagement with the hook 1104 while also improving a tolerance of the mating between the hook 1104 and the airbox 210. That is to say, the elastomeric insert 1112 may mitigate inadvertent decoupling between the hook 1104 and the airbox 210. The elastomeric insert 1112 may further enhance a sealing between the platform 230 and the airbox 210. In one example, the elastomeric insert 1112 adapts to the irregular surfaces of the airbox 210, which may be a byproduct of the blow molding process, to enhance the sealing of the airbox 210 and engagement of the snap fits. The elastomeric insert 1112 may further comprise wipers 1114. The wipers 1114 may be curved and may further enhance sealing of the airbox 210 and the platform 230. In one example, the elastomeric insert 1112 includes an arc shape and the wipers 1114 include an S-shape. In one example, additionally or alternatively, the curved elastomer 1112 block a hook of the snap fit from directly contacting a surface of the airbox.

Turning now to FIG. 12, it shows an embodiment 1200 of the airbox 210 and the platform 230. Therein, the platform 230 may be fixedly coupled to the airbox 210 via a plurality of fasteners 1210. In one example, the plurality of fasteners 1210 may be screws 1212. Additionally or alternatively, the plurality of fasteners 1210 may be push pins 1214. Thus, the platform is attached to the airbox with screws or push pins instead of the snap fits shown in FIG. 2.

Turning now to FIGS. 13A, 13B, and 13C, they show an alternative of an airbox 1310, an air filter 1320, and a platform 1330, respectively. In one example, the air filter 1320 and a filter seal 1322 differ from the air filter 234 and the filter seal 232 in that the filter seal 1322 may be molded directly onto a base of the air filter 1320. Additionally, a shape of the airbox 1310 and the platform 1330 may differ from the airbox 210 and the platform 230 of FIG. 2. In one example, slider ramps 1312, 1313 of the airbox 1310 may protrude into an interior space of the airbox to a lesser magnitude than the slider ramps 312, 313 of FIG. 4. A linear surface 1332 of the platform 1330 may be similar to the linear surface 314 of FIG. 6. However, the platform 1330 may be free of an angled surface, such that its size and weight are reduced. Thus, a manufacturing cost and complexity of the platform 1330 may be reduced relative to the platform 230 of FIG. 2.

Additionally or alternatively, the platform 1330 may comprise snap fits 1334 comprising an orientation normal to orientations of the first set of snap fits 602 and the second set of snap fits 604 of FIG. 6.

In this way, an airbox may be blow molded as a single piece. The airbox includes features for receiving and retaining an air filter arranged in a platform. The technical effect of blow molding the airbox as a single piece is to increase its durability while still providing features that provide a desired tolerance for retaining the air filter. The airbox may include elastomers or other inserts configured to engage with snap fits of the platform. The elastomers may increase a longevity of the snap fits while also enhancing a sealing of the airbox.

An embodiment of a system, comprises an airbox comprising a slot through which an air filter is configured to slide, wherein the air filter is retained within the airbox via a snap fit engaging with a curved elastomer of the airbox. A first example of the system further includes where the airbox is a blow-molded, single piece. A second example of the system, optionally including the first example, further includes where the air filter is arranged in an opening of a platform, wherein surfaces of the platform slidingly engage with slider ramps of the airbox. A third example of the system, optionally including one or more of the previous examples, further includes where the snap fit is one snap fit of a plurality of snap fits, wherein a first set of snap fits are oriented in a first orientation and a second set of snap sits are oriented in a second orientation opposite the first. A fourth example of the system, optionally including one or more of the previous examples, further includes where the platform comprises a plurality of embossments configured to adapt to a plurality of airbox embossments. A fifth example of the system, optionally including one or more of the previous examples, further includes where the curved elastomer of the snap fit absorbs manufacturing tolerances when contacting a surface of the airbox. A sixth example of the system, optionally including one or more of the previous examples, further includes where the airbox comprises a top surface, and wherein the top surface comprises a plurality of recesses parallel to one another. A seventh example of the system, optionally including one or more of the previous examples, further includes where the airbox comprises a conduit physically coupled to the top surface, and wherein the airbox further comprises an opening arranged on a surface of the airbox below the top surface, wherein the opening and the conduit are configured to admit and expel air to and from an interior space of the airbox.

An embodiment of an intake system, comprises an airbox comprising slider ramps, an air filter arranged in an opening of a platform, wherein the opening is at least partially defined by surfaces of the platform comprising an angled portion and a linear portion. A first example of the intake system further includes where the angled portion is positioned above the slider ramps in response to the platform being inserted into the airbox. A second example of the intake system, optionally including the first example, further includes where the platform is inserted through a slot and into an interior space of the airbox, and wherein the platform is attached to the air box with screws or push pins. A third example of the intake system, optionally including one or more of the previous examples, further includes where the platform further comprises an outer surface and an inner surface extending therefrom, wherein a plurality of snap fits extends toward the opening and is configured to engage with interior surfaces of the airbox. A fourth example of the intake system, optionally including one or more of the previous examples, further includes where the curved elastomer is an insert of the snap fit. A fifth example of the intake system, optionally including one or more of the previous examples, further includes where the angled portion and the linear portion extend in a direction normal to the outer surface. A sixth example of the intake system, optionally including one or more of the previous examples, further includes where the inner surface extends through a slot of the airbox, and wherein the outer surface is pressed against and in face-sharing contact with a front surface of the airbox when the platform is fully inserted into the airbox.

An embodiment of a system comprising an airbox blow-molded as a single piece, wherein the airbox comprises a front wall, a first side wall, a second side wall, and a back wall, and wherein the front wall comprises a slot, and a platform comprising a front surface, a first side surface, a second side surface, and a back surface shaping an opening, and wherein the platform further comprises an outer surface with an inner surface extending therefrom, wherein a spacer is arranged between and physically coupled to the inner surface and the front surface; wherein the platform is configured to slide through the slot. A first example of the system further includes where the first side wall comprises a first slider ramp and the second side wall comprises a second slider ramp, and wherein the first side surface and the second side surface comprise a linear portion and an angled portion, wherein the angled portion is angled toward the opening, and wherein the first slider ramp and the second slider ramp engage with an interface between the linear portion and the angled portion. A second example of the system, optionally including the first example, further includes where a plurality of snap fits extends from the inner surface toward the front surface, and wherein the plurality of snap fits press against curved elastomers arranged in the airbox. A third example of the system, optionally including one or more of the previous examples, further includes where the opening is shaped to receive and retain an air filter and an air filter seal, and wherein the air filter is molded directly to the platform. A fourth example of the system, optionally including one or more of the previous examples, further includes where the airbox further comprises a top surface physically coupled to each of the front wall, the first side wall, the second side wall, and the back wall, wherein the top surface further comprises a plurality of recesses extending in a direction parallel to one another and normal to the first side wall and the second side wall.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an airbox comprising a slot through which an air filter is configured to slide, wherein the air filter is retained within the airbox via a snap fit engaging with a curved elastomer within the airbox; and
a platform slidingly engaged with slider ramps of the airbox and comprising a plurality of embossments configured to adapt to a plurality of airbox embossments, wherein the air filter is arranged in an opening of the platform.

2. The system of claim 1, wherein the airbox is a blow-molded, single piece.

3. The system of claim 1, wherein the snap fit is one snap fit of a plurality of snap fits, wherein a first set of snap fits are oriented in a first orientation and a second set of snap sits are oriented in a second orientation opposite the first.

4. The system of claim 1, wherein the curved elastomer of the snap fit absorbs manufacturing tolerances when contacting a surface of the airbox.

5. The system of claim 1, wherein the airbox comprises a top surface, and wherein the top surface comprises a plurality of recesses parallel to one another.

6. The system of claim 5, wherein the airbox comprises a conduit physically coupled to the top surface, and wherein the airbox further comprises an opening arranged on a surface of the airbox below the top surface, wherein the opening and the conduit are configured to admit and expel air to and from an interior space of the airbox.

7. An intake system, comprising:

an airbox comprising slider ramps;

an air filter arranged in an opening of a platform, wherein the opening is at least partially defined by surfaces of the platform comprising an angled portion and a linear portion, wherein the angled portion is positioned above the slider ramps in response to the platform being inserted into the airbox.

8. The intake system of claim 7, wherein the platform is inserted through a slot and into an interior space of the airbox, and wherein the platform is attached to the airbox with screws or push pins.

9. The intake system of claim 7, wherein the platform further comprises an outer surface and an inner surface extending therefrom, wherein a plurality of snap fits extends toward the opening and is configured to engage with interior surfaces of the airbox.

10. The intake system of claim 9, wherein a curved elastomer is an insert of the snap fit.

11. The intake system of claim 9, wherein the angled portion and the linear portion extend in a direction normal to the outer surface.

12. The intake system of claim 9, wherein the inner surface extends through a slot of the airbox, and wherein the outer surface is pressed against and in face-sharing contact with a front surface of the airbox when the platform is fully inserted into the airbox.

13. A system, comprising:

an airbox blow-molded as a single piece, wherein the airbox comprises a front wall, a first side wall, a second side wall, and a back wall, and wherein the front wall comprises a slot; and a platform comprising a front surface, a first side surface, a second side surface, and a back surface shaping an opening, and wherein the platform further comprises an outer surface with an inner surface extending therefrom, wherein a spacer is arranged between and physically coupled to the inner surface and the front surface, wherein the first side wall comprises a first slider ramp and the second side wall comprises a second slider ramp, and wherein the first side surface and the second side surface comprise a linear portion and an angled portion, wherein the angled portion is angled toward the opening, and wherein the first slider ramp and the second slider ramp engage with an interface between the linear portion and the angled portion; wherein the platform is configured to slide through the slot.

14. The system of claim 13, wherein a plurality of snap fits extends from the inner surface toward the front surface, and wherein the plurality of snap fits press against curved elastomers arranged in the airbox.

15. The system of claim 13, wherein the opening is shaped to receive and retain an air filter and an air filter seal, and wherein the air filter is molded directly to the platform.

16. The system of claim 13, wherein the airbox further comprises a top surface physically coupled to each of the front wall, the first side wall, the second side wall, and the back wall, wherein the top surface further comprises a plurality of recesses extending in a direction parallel to one another and normal to the first side wall and the second side wall.

* * * * *